United States Patent
Kamata

(10) Patent No.: US 6,603,926 B2
(45) Date of Patent: Aug. 5, 2003

(54) LENS-FITTED PHOTO FILM UNIT AND MANUFACTURING METHOD THEREFOR

(75) Inventor: Kazuo Kamata, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/166,679

(22) Filed: Jun. 12, 2002

(65) Prior Publication Data

US 2002/0191972 A1 Dec. 19, 2002

(30) Foreign Application Priority Data

Jun. 13, 2001 (JP) ........................................ 2001-178148

(51) Int. Cl.[7] .............................................. G03B 17/02
(52) U.S. Cl. ........................................................ 396/6
(58) Field of Search .................... 396/6, 535; 206/316.2

(56) References Cited

U.S. PATENT DOCUMENTS

| | | | | |
|---|---|---|---|---|
| 5,488,445 A | * | 1/1996 | Oi et al. ........................ | 396/6 |
| 5,600,391 A | * | 2/1997 | VanDeMoere et al. ......... | 396/6 |
| 5,711,424 A | * | 1/1998 | Kiesow ................... | 206/316.2 |
| 5,918,082 A | | 6/1999 | Katsura | |
| 6,308,829 B1 | * | 10/2001 | Yogata et al. ............ | 206/316.2 |

FOREIGN PATENT DOCUMENTS

| EP | 0 778 492 A1 | 6/1997 |
|---|---|---|
| JP | 10-260509 | 9/1998 |

* cited by examiner

Primary Examiner—Russell Adams
Assistant Examiner—Michelle Nguyen
(74) Attorney, Agent, or Firm—Young & Thompson

(57) ABSTRACT

A lens-fitted photo film unit has a front cover. A logotype indicating a manufacturer or a brand is formed in a hollow of the front cover. Either a transparent supplement cover or an opaque supplement cover is fitted in this hollow. The transparent supplement cover is selected upon using the logotype of the front cover. The opaque supplement cover is selected upon covering the logotype of the front cover. Another logotype is formed on this opaque supplement cover.

15 Claims, 4 Drawing Sheets

LENS-FITTED PHOTO FILM UNIT AND MANUFACTURING METHOD THEREFOR

BACKGROUND OF THE INVENTION

1. Field of the Invention

The present invention relates a lens-fitted photo film unit and its manufacturing method, more particularly to the lens-fitted photo film unit that a letter or a mark formed on the unit body is selectively observable.

2. Explanations of the Prior Arts

A lens-fitted photo film unit with a simple taking mechanism has been produced so that they can enjoy taking pictures easily and anytime. The lens-fitted photo film unit is widely used due to its convenience that photography is immediately possible after purchase, and just asking a photo-lab for photofinishing is needed.

The lens-fitted photo film unit consists of a unit body with an unexposed photographic film preloaded, and an outer label surrounding at least a part of the unit body like a belt. The unit body consists of a main body with a simple taking mechanism attached, a front cover and a rear cover covering around the main body.

Recently, an illegal sale that a new photographic film is loaded in an empty lens-fitted photo film unit after removing an exposed photographic film has been done. So as to cope with such illegal film reloading, a name of a manufacturer, a letter of a brand, a mark or a trademark of a company indicating its origin is formed on the front cover or the rear cover. The letter and the mark are formed by making grooves or irregularities around its contour upon plastic molding.

The lens-fitted photo film unit is used as a gift for helping sales promotion or a present to customers. In such a case, it is preferable to add the name or the mark of the gift-providing company to the unit body on behalf of the manufacturer. It is necessary for this purpose to prepare an injection mold in which the letter of the company are formed. In case of small production, however, manufacturing cost is remarkably raised as molding is expensive. Accordingly it is used a replaceable core or telescopic on which the name of the gift-providing company is engraved, so as to be fitted into a hollow part of the molding (See Japanese Patent laid-open Publication No.10-260509). In case the telescopic is used, however, as the injection mold has a water pipe for rapid resin cooling, the mold is deteriorated and the resin cooling takes time. As a result manufacturing cost is raised.

SUMMARY OF THE INVENTION

An object of the present invention is to provide a lens-fitted photo film unit of which a letter or a mark is changeable easily and cheaply.

In order to achieve the above object, the lens-fitted photo film unit of the present invention is provided with a supplement cover, which is attached to the outside of the lens-fitted photo film unit, for covering the letter or the mark to be visible from outside. The letter or the mark is indicated by making irregularities or printing. When the letter or the mark is done on an opaque part of the lens-fitted photo film unit, the letter or the mark is formed on an outside of the opaque part. Meanwhile, when done on a transparent part, the letter or the mark is formed on an outside or an inside of the transparent part. In case an outline of the letter or the mark is represented by groove or protrusion, protrusion or groove is formed on the mold. The groove or protrusion of the letter or the mark on the product is formed in simultaneous with mold forming.

There are a transparent type and an opaque type in the supplement cover. When the letter or the mark originally formed on the lens-fitted photo film unit is used, the transparent type is selected. When another letter or mark is used, the opaque type is selected.

According to the preferred embodiment of the present invention, either a first outer label or a second outer label is selected, and either of them is attached to the unit body. The first outer label has an opening which exposes the letter or the mark of the lens-fitted photo film unit so as to be visible. The second outer label covers the letter or the mark so as to be invisible. There forms another letter or mark on this second outer label.

According to the present invention, the letter or the mark of the lens-fitted photo film unit is made visible or invisible by selecting either the transparent type or the opaque type in the supplement cover, or by selecting either the outer label with opening or the outer label without opening. The letter or the mark can be easily and cheaply changed by use of the supplement cover or the outer label having different letter or mark thereon. Moreover, it is convenient in that the unit body can be commonly made use of.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
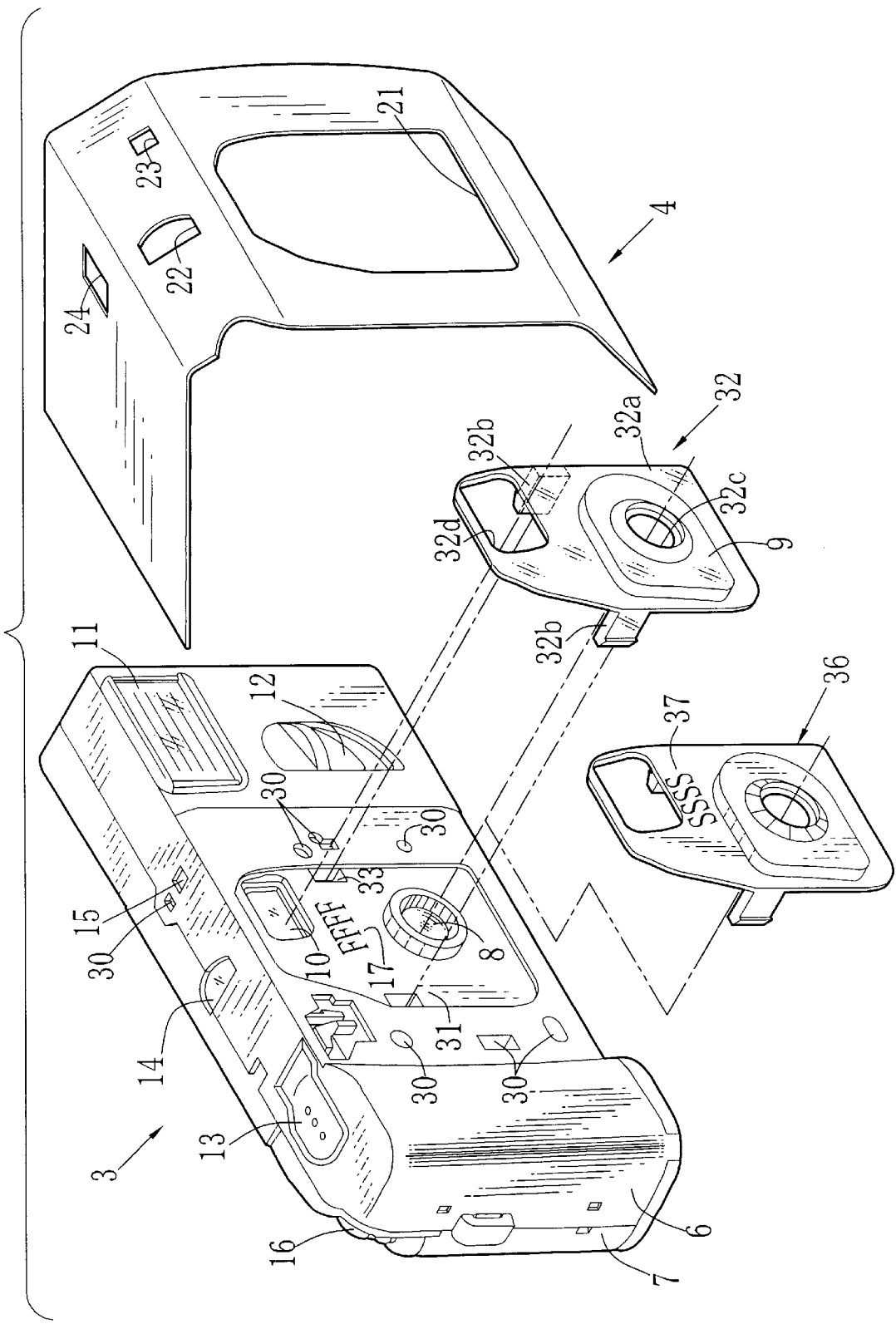
FIG. 1 is an exploded perspective view of a lens-fitted photo film unit of the present invention.

In FIG. 1, a lens-fitted photo film unit consists of a unit body 3 and an outer label 4. The unit body 3 is constituted of a main body (not shown), a front cover 6, and a rear cover 7. An unexposed photographic film is incorporated in a base of the main body made from opaque plastic and a simple taking mechanism is attached to the base. The front cover 6 and the rear cover 7, made from opaque plastic, are attached to the front or the behind of the main body (See U.S. Pat. No. 5,918,082 issued on Jun. 29, 1999).

The front of the unit body 3 is provided with a taking lens 8, a finder objective window 10, a flash projector 11, and a flash switch 12. A release button 13, a film counter window 14, and a flash completion indicator lamp 15 are provided on the top of the unit body 3. A take-up wheel 16 and a finder eyepiece window (not shown) are provided on the rear of the unit body 3.

A logotype 17 for indicating the source is formed observable on the upper part of the taking lens 8. The logotype 17 such as a letter (including a number) or a mark is formed outside the front cover 6. The logotype 17 is a name or a mark of a manufacturer and a brand. The letter or the mark is represented by groove or convex line along a contour thereof. The groove or the convex is made by molding in synchronization with plastic molding. Additionally, the logotype 17 maybe formed by printing. A hollow 31 is formed on the front of the front cover 6. The taking lens 8, the finder objective window 10, and the logotype 17 are positioned within the hollow 31. A groove section 33 is formed in the hollow 31. A numeral 30 is an opening for assembling and adjusting.

Either a transparent supplement cover 32 or an opaque supplement cover 36 is attached to the hollow 31. The transparent supplement cover 32 is selected when indicating the logotype 17 formed on the front cover in advance. The opaque supplement cover 36 is selected when indicating an another logotype 37 in place of the logotype 17. Note that the transparent supplement cover 32 may be semitransparent or colored in addition to completely transparent because it is for making the logotype 17 observable.

The transparent supplement cover 32 consists of a thin transparent plate 32a and a claw 32b projecting from the rear of the transparent plate 32a. The transparent plate 32a, having an approximate same size as the hollow 31 of the front cover 6, is fitted in the hollow 31 of the front cover 6, so that the front of the front cover 6 and the front of the transparent supplement cover 32 turns to be a successive surface. A lens opening 32c and a finder opening 32d are formed on the transparent plate 32a, so as to expose the taking lens 8 and the finder objective window 10 respectively. Moreover, a protruding section 9 is formed on the transparent plate 32a so as to surround the lens opening 32c.

Figure 3:
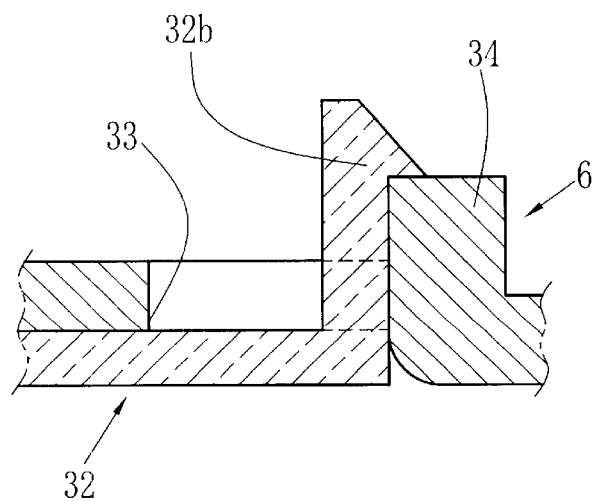
FIG. 3 is an essential cross section showing a state in which the transparent supplement cover is attached.

As shown in FIG. 3, a protrusion 34 for engaging with the claw 32b is formed on the side of the groove section 33. By bending the claw 32b inward, the transparent supplement cover 32 is removably fitted to the front cover 6.

The opaque supplement cover 36 has the same shape with the transparent supplement cover 32 and a logotype 37 is formed thereon. This logotype 37 is indicated by a contour, which is grooved, made protrusion, or printed. When the opaque supplement cover 36 is selected, the logotype 17 is covered, to be observable another logotype 37. Note that another logotype is not formed on the opaque supplement cover 36 in case the logotype 17 has only to be invisibly covered.

The outer label 4 is stuck detachable to the unit body 3 by use of an adhesive so as to cover the center of the unit body 3 like a belt. This outer label 4 is made of a thin plastic or a paper, on which a letter, a design, directions for use, and so forth are printed. The outer label 4 has a front opening 21 which has approximately the same size as the supplement covers 32 and 36. In case of covering the contours of the supplement covers 32 and 36, the front opening 21 is made smaller than the supplement covers 32 and 36. The protruding section 9, the finder objective window 10, and the logotype 17 are positioned within the front opening 21. A counter opening 22, a flash lamp opening 23, and a finder opening 24 are respectively formed in parts corresponding to the film counter window 14, the flash completion indicator lamp 15, and the finder eyepiece window. And the opening 30 is covered by the outer label 4.

Figure 2:
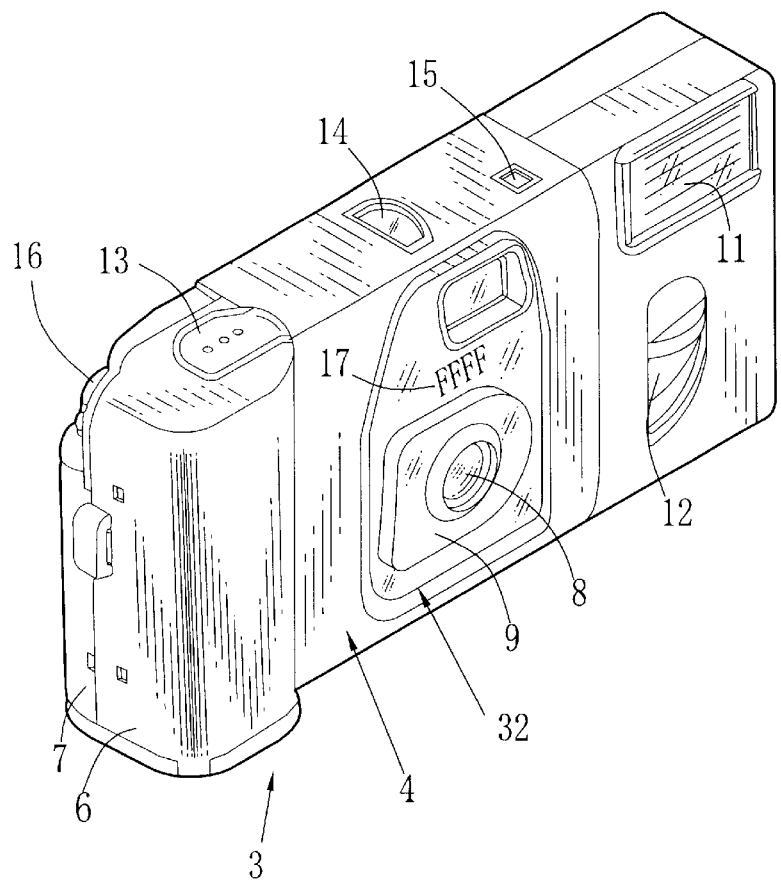
FIG. 2 is a front perspective view of the lens-fitted photo film unit with a transparent supplement cover attached.

Then, assembling method is explained. The taking mechanism, the taking lens 8 and so forth is attached to the main body. Then the front cover 6 is attached thereto. After an unexposed photographic film is loaded into the main body in a darkroom, the rear cover 7 is attached. Either the supplement cover 32 or 36, which is selected whether to use the logotype 17 or not, is fitted in a hollow 31. When the transparent supplement cover 32 is selected, as shown in FIG. 2, the logotype 17 becomes observable. When the opaque supplement cover 36 is selected, the logotype 17 is covered to be observable only the logotype 37. This opaque supplement cover 36 is manufactured upon receipt of order. The outer label 4 is stuck to the lens-fitted photo film unit, to be completed after several examinations. The finished product is wrapped in a gusset package and shipped.

It is also suitable to attach the transparent supplement cover 32 to all the lens-fitted photo film unit in advance. In case the logotype is kept unchanged, the film unit is shipped with the transparent supplement cover 32 attached to the front cover 6. In case the logotype is changed, on the other hand, the transparent supplement cover 32 is removed from the front cover 6 through the outer label 4, and instead of this, the opaque supplement cover 36 is attached to the front cover 6.

Figure 4:
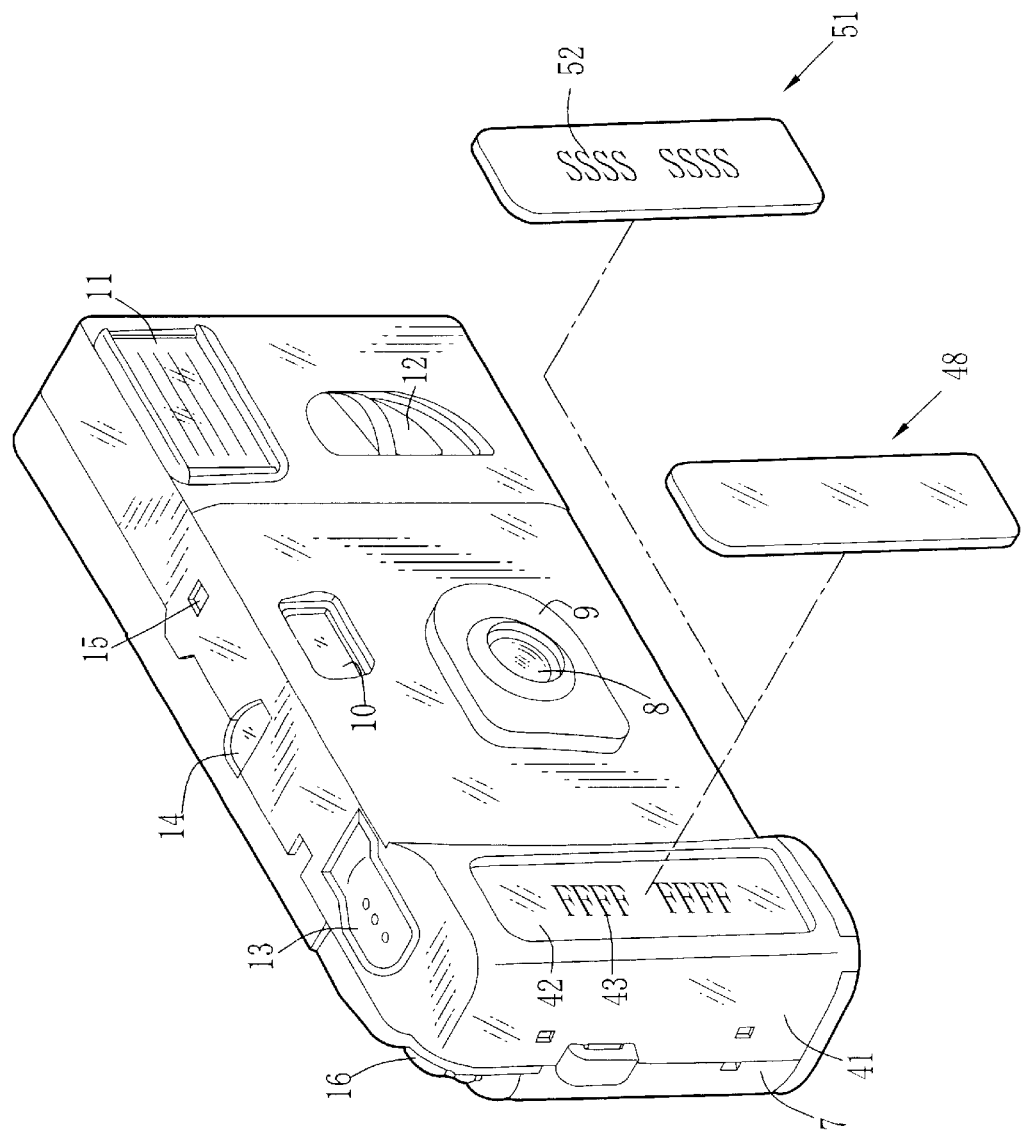
FIG. 4 is an exploded perspective view of the lens-fitted photo film unit illustrating another embodiment of supplement covers.

The logotype 17 is formed at the center front of the unit body 3 in the above embodiment. However, any position is suitable. FIG. 4 illustrates an embodiment having a logotype on the grip part. A front cover 41 that is made from transparent plastic has the grip part on the left side. The grip part has a hollow 42, in which a logotype 43 is formed. The logotype 43 is formed outside or inside of the front cover 41.

In case of using the logotype 43, a transparent supplement cover 48 is selected, whereas in case of another logotype 52, an opaque supplement cover 51 is selected. These supplement covers 48 and 51 are fitted in the hollow 42. The transparent supplement cover 48 is a transparent plate, while the opaque supplement cover 51 is a plate having light-shielding property. A logotype 52 by grooving or printing is formed on the surface of the opaque supplement cover 51. A character's name of an animation, for instance, is used as logotype 52. Either the transparent supplement cover 48 or the opaque supplement cover 51 is put on the hollow 42 after applying a transparent adhesive to the surrounding part of the hollow 42. Note that, as shown in FIG. 3, the supplement covers 48 and 51 may be engaged with the front cover by a claw. And it is also suitable to use an opaque adhesive or a double-coated tape in case of using the opaque supplement cover 51.

Figure 5:
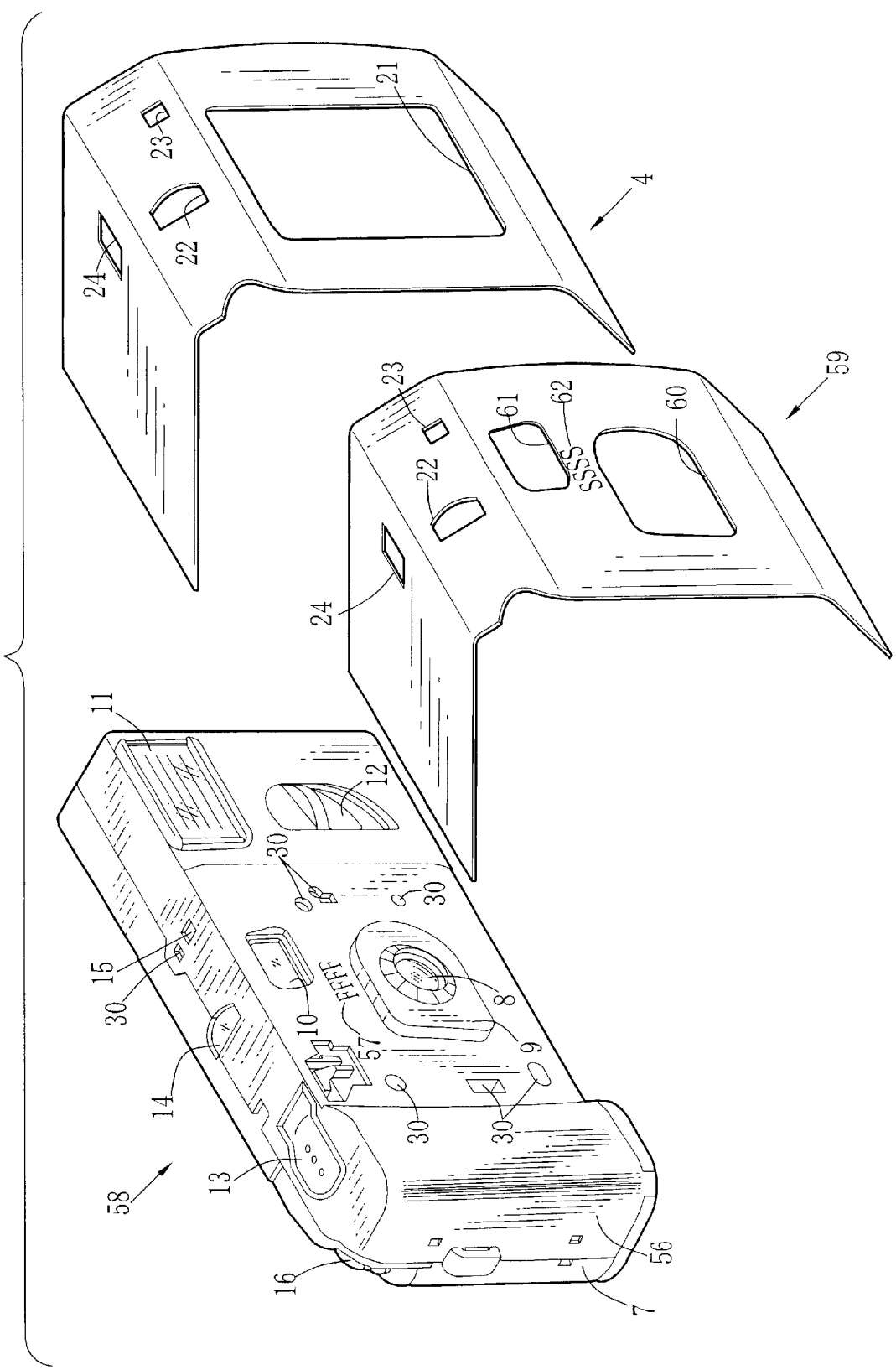
FIG. 5 is an exploded perspective view illustrating an embodiment selecting an outer label.

In FIG. 5, a logotype 57 is formed on the surface of a front cover 56. In case the logotype 57 is used, the outer label 4 is selected, whereas in case the logotype 57 is not used, an outer label 59 is selected. The outer label 4 or 59 is stuck on the center of the unit body 58.

The outer label 59 not only covers the logotype 57, but also another logotype 62 is printed thereon. A taking opening 60 and a finder opening 61 are respectively formed in parts corresponding to the protruding section 9 and the finder objective window 10 of the unit body 58.

In the above embodiment, the outer label is a sheet to be attached to a part of the unit body. However, the outer label of the present specification includes a box for containing the unit body. In case the supplement cover may be protruded, the front cover needs not the hollow. In the embodiment shown in FIG. 4, the transparent supplement plate 48 is not needed in case the hollow 42 is omitted. Furthermore, the opaque supplement cover 36 may be omitted to cover the logotype 43 with the outer label.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A system for producing a lens-fitted photo film unit with an unexposed photographic film preloaded comprising:

a lens-fitted photo film unit body comprising a letter or a mark positioned on an exterior surface of said lens-fitted photo film unit body;

a first alternative supplement cover having a size and shape so that the first alternative supplement cover can be secured to the exterior surface of said lens-fitted photo film unit body so as to cover said letter or said mark; and a second alternative supplement cover having a size and shape so that the second alternative supplement cover can be secured to the exterior surface of said lens-fitted photo film unit body so as to cover said letter or said mark;

wherein the first alternative supplement cover is sufficiently translucent so that the letter or mark on the exterior surface of the lens-fitted photo film unit body is observable through the first alternative supplement cover when the first alternative supplement cover is secured to the lens-fitted photo film unit body; and wherein the second alternative supplement cover is opaque so that the letter or mark is not visible if the second alternative supplement cover is secured to the exterior surface of the lens-fitted photo film unit body.

2. The system of claim 1, wherein the first and second alternative supplement covers and the lens-fitted photo film unit body are structured and arranged so that either of the first and second alternative supplement covers can be mechanically secured to the lens-fitted photo film unit body.

3. The system of claim 2, wherein each of the first and second alternative supplement covers comprises a claw.

4. The system of claim 3, wherein the lens-fitted photo film unit body comprises a recess positioned to accept the claw of one of the first and second alternative supplement covers.

5. A lens-fitted photo film unit with an unexposed photographic film preloaded comprising:

a letter or a mark formed in said lens-fitted photo film unit, said letter or said mark being observable from outside;

a supplement cover attached to an outer surface of said lens-fitted photo film unit so as to cover said letter or said mark; and a hollow part formed in said outer surface of said lens-fitted photo film unit, said letter or said mark formed in said hollow part, and said supplement cover being fitted to said hollow part.

6. A lens-fitted photo film unit as claimed in claim 5, wherein said lens-fitted photo film unit has a unit body with a front cover and a rear cover attached.

7. A lens-fitted photo film unit as claimed in claim 6, wherein said hollow part is formed on said front cover.

8. A lens-fitted photo film unit as claimed in claim 7, wherein said supplement cover is transparent, so as to make said letter or said mark visible through said supplement cover.

9. A lens-fitted photo film unit as claimed in claim 7, wherein said supplement cover is opaque, so as to make said letter or said mark invisible.

10. A lens-fitted photo film unit as claimed in claim 9, wherein said opaque supplement cover has another letter or mark formed on an outer surface thereof.

11. A manufacturing method of a lens-fitted photo film unit, said lens-fitted photo film unit having a unit body with an unexposed photographic film preloaded, said method comprising the steps of:

providing a lens-fitted photo film unit body having a letter or a mark arranged on an exterior surface of said unit body so as to be observable from outside;

providing a first alternative supplement cover having a size and shape so that the first alternative supplement cover can be secured to the exterior surface of said lens-fitted photo film unit body so as to cover said letter or said mark;

providing a second alternative supplement cover having a size and shape so that the second alternative supplement cover can be secured to the exterior surface of said lens-fitted photo film unit body so as to cover said letter or said mark; and attaching one of the first and second alternative supplement covers to said unit body;

wherein the first alternative supplement cover is sufficiently translucent so that the letter or mark on the exterior surface of the lens-fitted photo film unit body is observable through the first alternative supplement cover if the first alternative supplement cover is secured to the lens-fitted photo film unit body; and wherein the second alternative supplement cover is opaque so that the letter or mark is not visible if the second alternative supplement cover is secured to the exterior surface of the lens-fitted photo film unit body.

12. A method as claimed in claim 11, wherein said opaque supplement cover has another letter or mark formed outside thereof.

13. A manufacturing method of a lens-fitted photo film unit, said lens-fitted photo film unit having a unit body with an unexposed photographic film preloaded, said method comprising the steps of:

forming a letter or a mark on said unit body so as to be observable from outside; and attaching either a transparent supplement cover or an opaque supplement cover to said unit body, said letter or said mark being visible through said transparent supplement cover, and said letter or said mark being invisible through said opaque supplement cover, said opaque supplement cover having another letter or mark formed outside thereof;

wherein said letter or mark is formed in a hollow part of said unit body, and said transparent supplement cover or said opaque supplement cover is fitted in said hollow part.

14. A manufacturing method of a lens-fitted photo film unit, said lens-fitted photo film unit having a unit body with an unexposed photographic film preloaded, said method comprising the steps of:

forming a letter or a mark on said unit body so as to be observable from outside; and attaching either a first outer label or a second outer label to said unit body, said first outer label having an opening that exposes said letter or said mark so as to be visible, said second outer label covers said letter or said mark so as to be invisible.

15. A method as claimed in claim 14, wherein said second outer label has another letter or mark formed on an outer surface thereof.

* * * * *